Oct. 14, 1952 — C. G. ROPER — 2,614,163
ELECTROMECHANICAL CONTROL AND INDICATING SYSTEM
Filed Oct. 21, 1947 — 8 Sheets-Sheet 1

INVENTOR.
Charles G. Roper
BY Darby & Darby
Att'ys.

INVENTOR.
Charles G. Roper.
BY Darby + Darby
Att'ys.

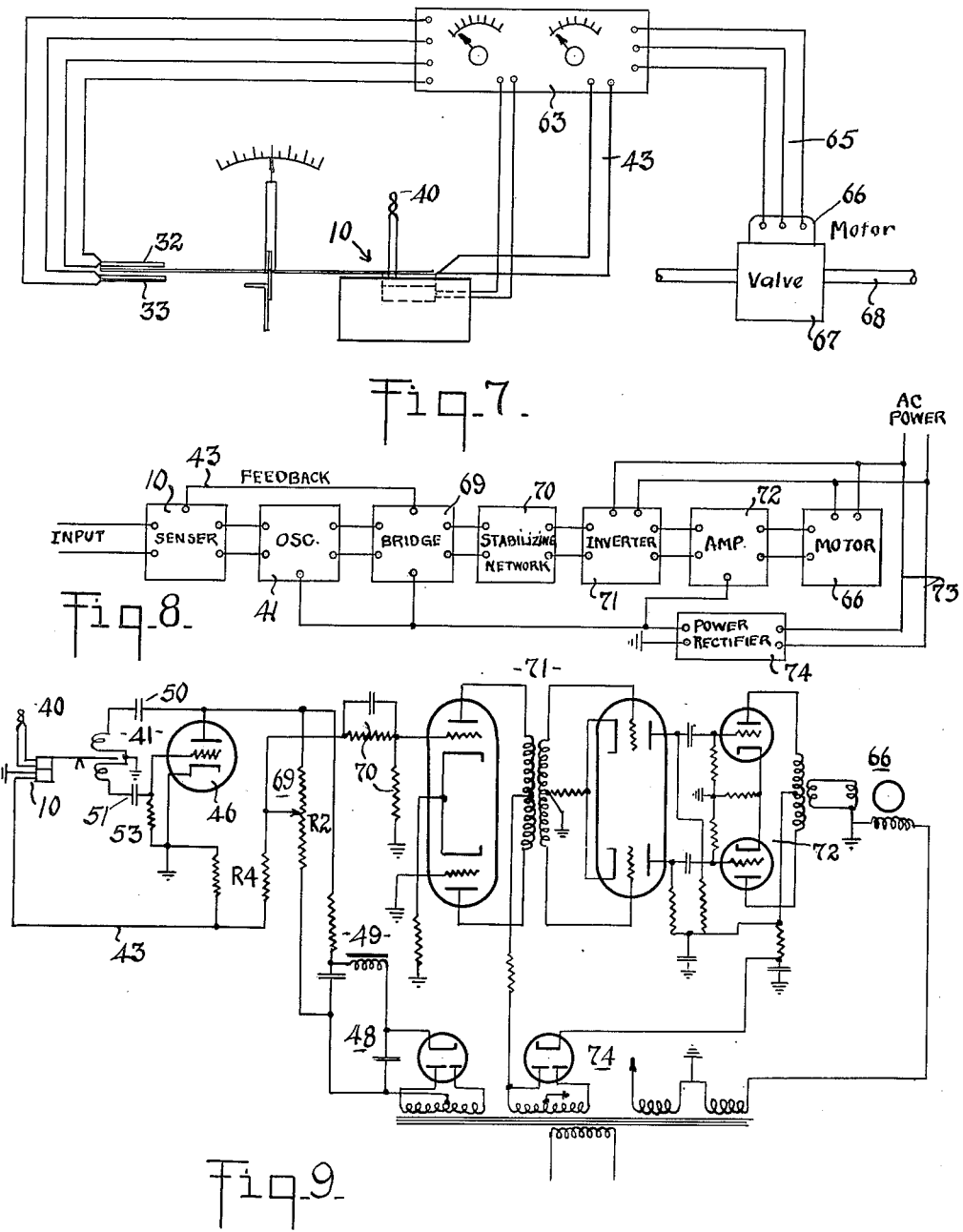

Oct. 14, 1952  C. G. ROPER  2,614,163
ELECTROMECHANICAL CONTROL AND INDICATING SYSTEM
Filed Oct. 21, 1947  8 Sheets-Sheet 5
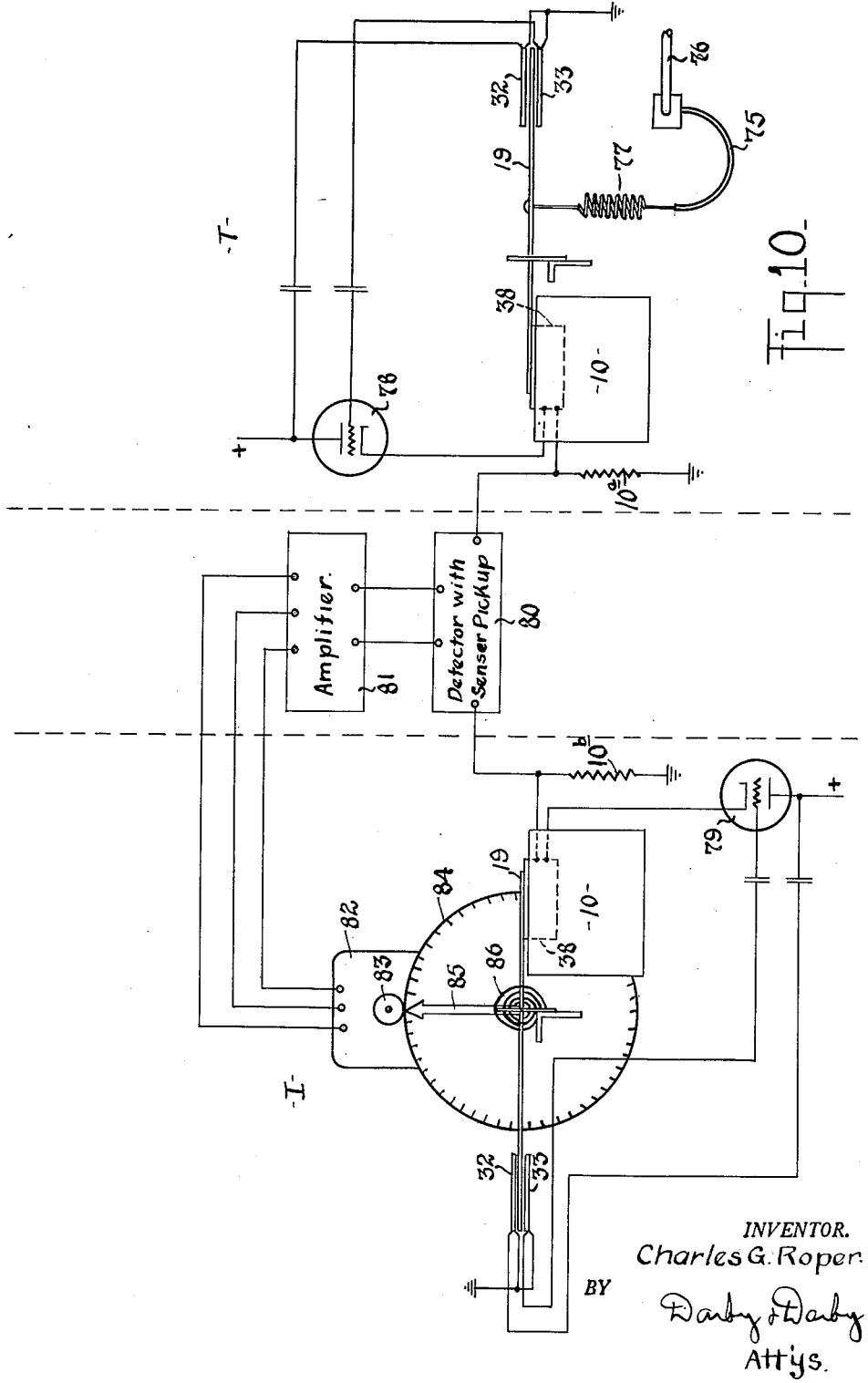
INVENTOR.
Charles G. Roper
BY
Darby & Darby
Att'ys.

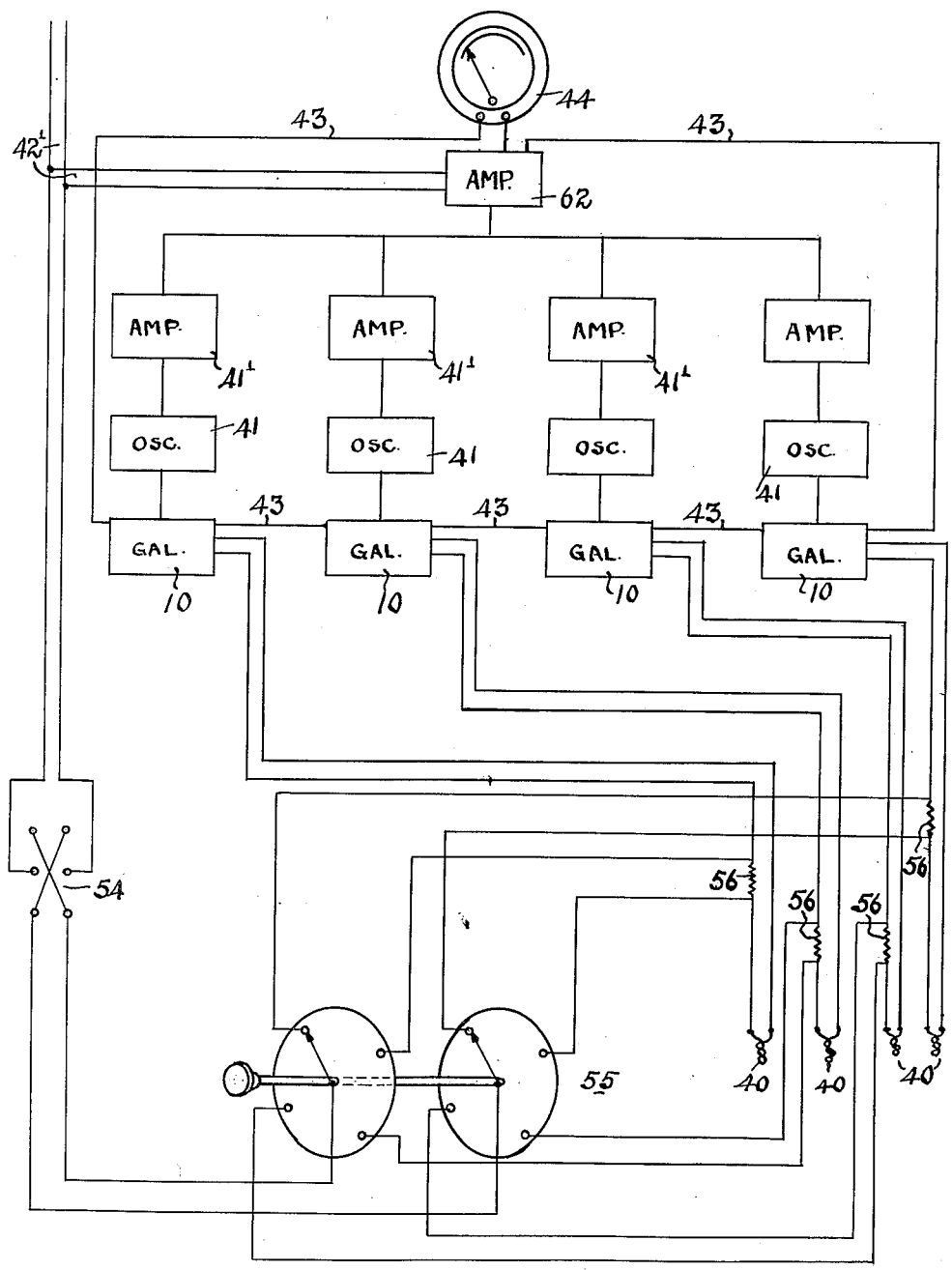

Oct. 14, 1952          C. G. ROPER          2,614,163
ELECTROMECHANICAL CONTROL AND INDICATING SYSTEM
Filed Oct. 21, 1947          8 Sheets—Sheet 7
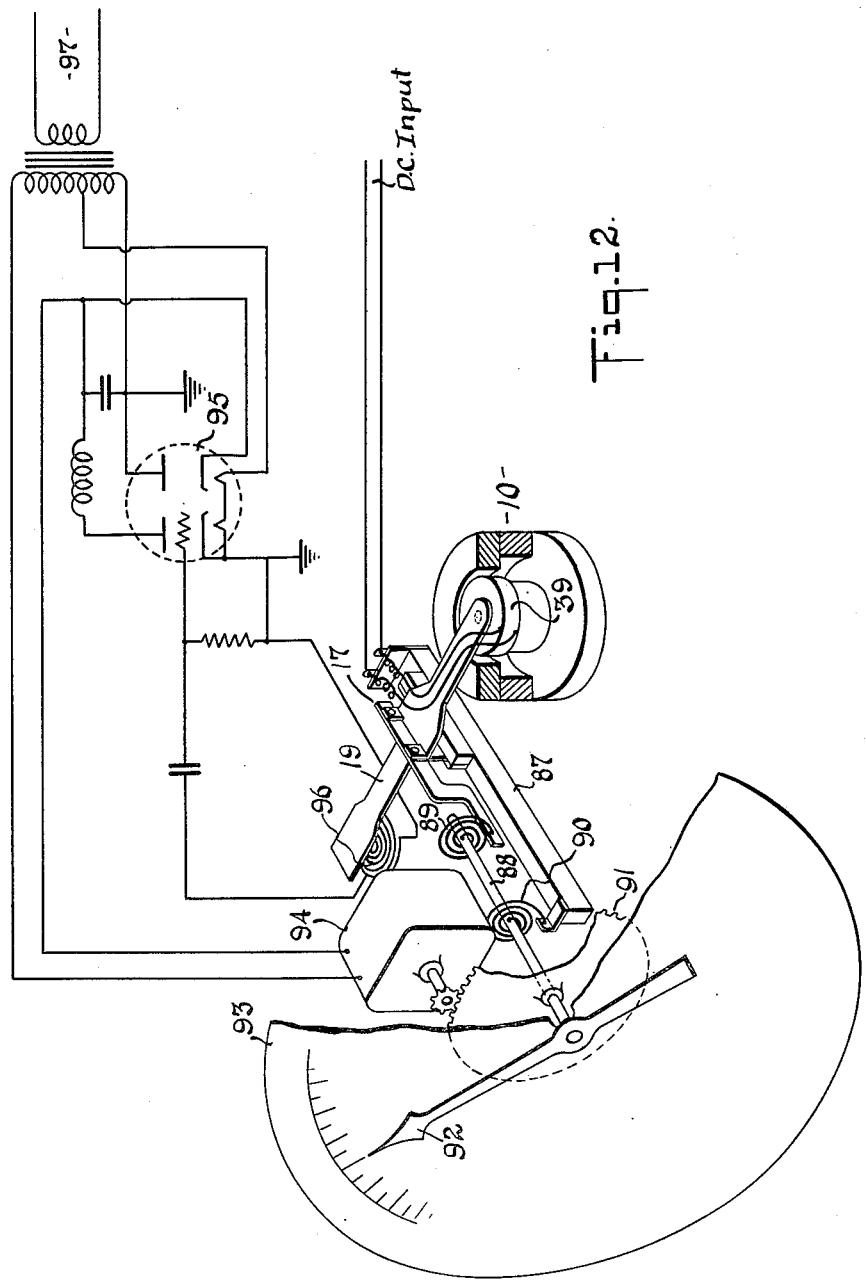
INVENTOR
CHARLES G. ROPER
BY Darby & Darby
ATTORNEYS

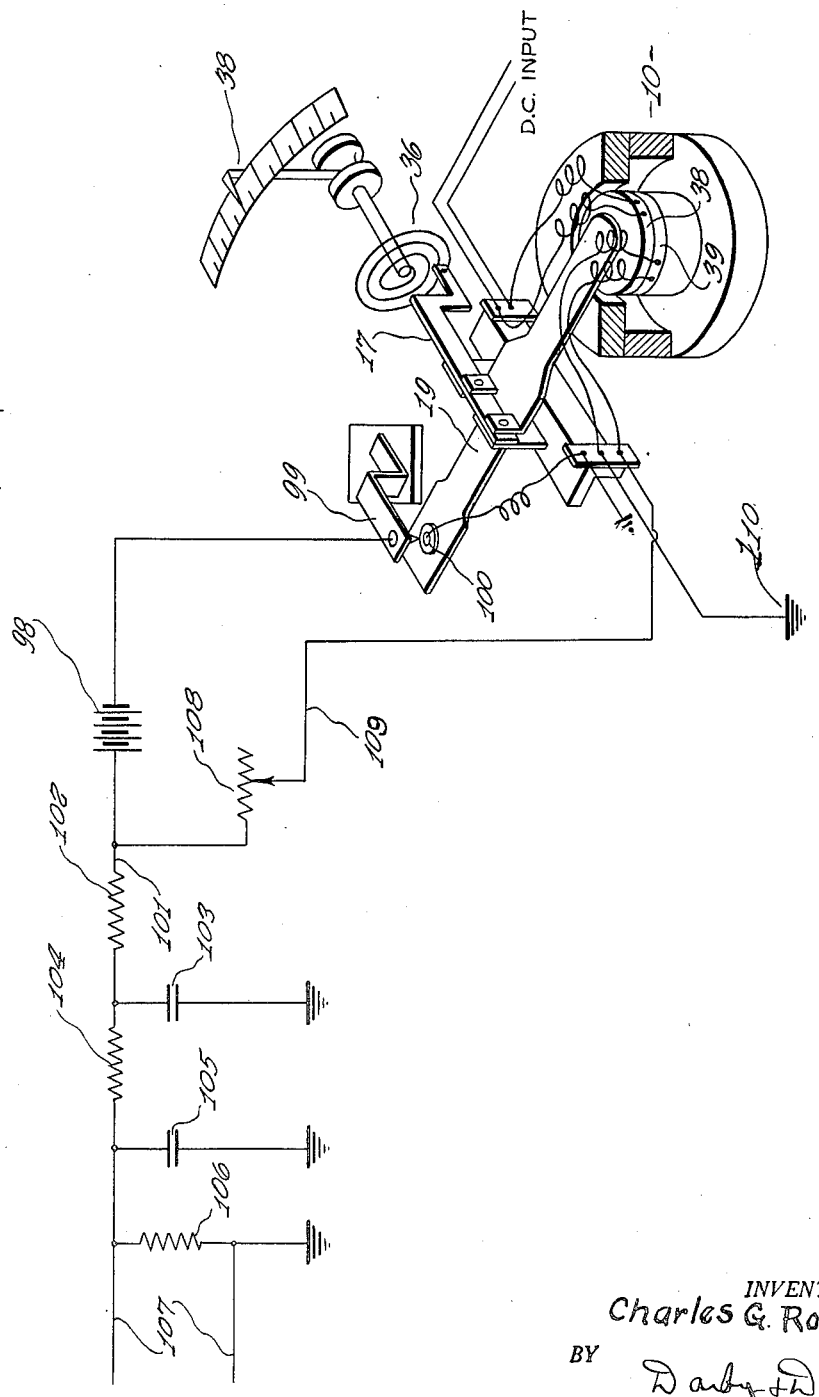

Patented Oct. 14, 1952

2,614,163

UNITED STATES PATENT OFFICE 2,614,163

ELECTROMECHANICAL CONTROL AND INDICATING SYSTEM

Charles Garland Roper, Fairfield, Conn., assignor to Manning, Maxwell & Moore, Inc., New York, N. Y., a corporation of New Jersey Application October 21, 1947, Serial No. 781,066

9 Claims. (Cl. 177—351)

This invention is concerned with various forms of electro-mechanical control and indicating systems for process control and indication of the magnitude of variable factors involved in such systems.

An object of this invention is to provide electromechanical control and indicating systems of this type employing electro-mechanical degenerative operation to provide high gain stable direct current amplification for low impedance, low current inputs.

Another object of this invention is to provide an electro-mechanical degenerative control and indicating system by means of which heat processes may be automatically operated.

Another object of this invention is to provide such a system adapted to the indication of the maximum of a plurality of related temperature conditions as well as to provide means for selectively determining the source of such maximum temperature.

It is a more specific object within the scope of the former objects to provide an automatic indicating system applicable, for example, to the supervision of the operation of an internal combustion engine or engines whereby a continuous indication of the temperatures of the bearings thereof, for example, is provided to the extent that the temperature of the hottest bearing of a plurality is indicated.

It is a still more specific object of the invention to provide in such a system selector means whereby the hottest bearing can be located.

It is also an object of this invention to provide electro-mechanical degenerative control systems whereby processes may be automatically controlled in accordance with changes in a variable factor affecting the operation of such processes as, for example, temperature pressure conductivity, liquid flow, and the like.

It is a general object of this invention to provide systems of the above types wherein the electrical portion thereof involves the use of vacuum tube oscillators to attain stable high gain amplification for low impedance current input.

Another object of this invention is to provide a system for control, indication, or both, wherein variations of an electrical or mechanical force are used to produce an amplified output by means of an electrically stabilized relay.

The many other and more detailed objects of this invention will be apparent from the following description of the several embodiments of the invention illustrated in the attached drawings as indicative of the scope of the invention herein disclosed.

This invention resides substantially in the combination, construction, arrangement and relative location of parts as will be hereinafter described.

In the accompanying drawings—

Figure 7 is a diagrammatic and schematic illustration of a form of the invention as employed to control a heat process;

Figure 8 is an expanded schematic illustration of the electrical circuits of Figure 7;

Figure 9 is a diagrammatic circuit illustration of the elements of the system of Figure 7;

Figure 10 is a diagrammatic and schematic illustration of another embodiment of the invention providing a remote null point indicating (of controlling) system for measuring pressure variations;

Figure 11 is a circuit illustration of a system like that of Figure 6 to which has been added means for selecting the source of highest temperature from a plurality of sources simultaneously monitored;

Figure 1:
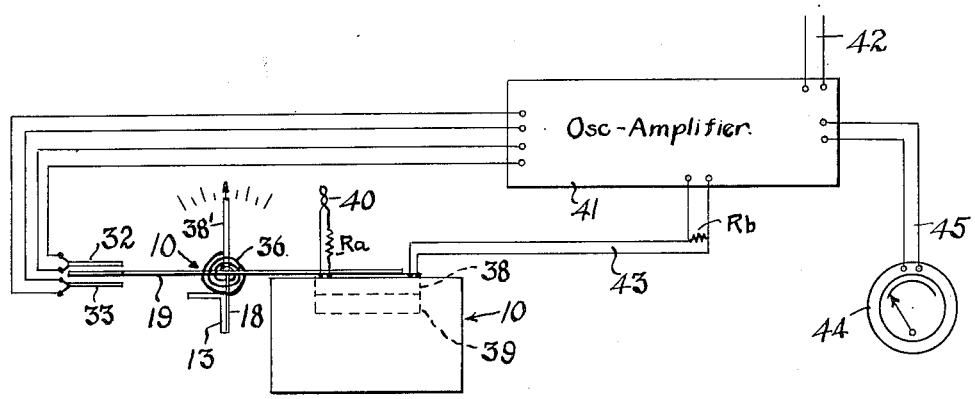
Figure 1 is a diagrammatic and schematic illustration of a temperature controlled electro-mechanical measuring system, in accordance with this invention, comprising a stabilized direct current amplifier.

Figure 12 is a diagrammatic and schematic illustration of the application of the subject matter of this invention to a servo-ammeter or direct current indicator for indicating the magnitude of any variable which can be represented by a direct current; and Figure 13 is a diagrammatic and schematic illustration of a modified system employing the senser unit to operate circuit contacts to regulate the magnitude of a current representative of a variable as distinguished from controlling the operation of an oscillator as in the previous systems.

The systems herein disclosed employ an electromechanical degenerative system to provide high gain, stable D. C. amplification for low impedance, low current inputs. There is illustrated herein not only systems of this kind but several embodiments of the possible applications thereof.

Some of the advantages of such a system can be emphasized by pointing out some of the disadvantages of prior methods of D. C. amplification. The wholly electronic tube D. C. amplifier is subject to drift resulting from supply voltage variation, tube characteristic instability and the effects of temperature and humidity. Amplifiers of this type do not lend themselves to low impedance inputs. When voltage regulation and balanced circuits are used to reduce drift such amplifiers become complicated and unwieldy. For industrial and aircraft use, complexity and size not to mention cost are of vital importance and render such amplifiers of limited utility for such uses. The chopper type D. C. amplifier while it can be used with a low impedance input structurally is difficult and expensive to make. For many industrial purposes, as well as aircraft applications, where space and weight are at a premium, it is inconvenient and its extremely high gain is unnecessary.

The above difficulties are avoided by means of the basic combination of this invention. In that combination a low level voltage input to a galvanometer is converted into motion and this motion is then employed to tune an oscillator by means of the movement of a metal flag, to vary the output of a tuned grid-tuned plate oscillator. The motion of the metal flag loads and unloads the tank circuit of the oscillator with consequent variation in the input voltage of the oscillator. With a reasonably sensitive galvanometer movement, such means of operation can easily supply voltage gains of $10^6$. However, in accordance with this invention, the galvanometer is provided, for example, with an extra coil and the output voltage of a direct current amplifier fed by said oscillator, is applied to that extra coil. This extra coil measures the output current in relation to the input current by supplying a force which is applied in opposition to the original force of the input current. This provides a stabilized D. C. feedback amplifier system of considerable simplicity. As the input coil of the galvanometer comprises a relatively few turns of wire, the input impedance is low. The galvanometer is so constructed as to provide an extremely high gain mechanical input stage, eliminating the necessity for input tube selection and close control of operating conditions. The extremely high initial gain of such an electro-mechanical D. C. amplifier provides a large feedback factor, thereby reducing over-all drift of the amplifier with a resultant gain sufficiently large for many control and indicating purposes.

An additional advantage of such a combination resides in the improved time response of the galvanometer. In other words, the natural undampened period of such a mechanical system is reduced to a fraction of its original value.

Another advantage of this system, when used as a voltage amplifying system, resides in the ability to completely compensate the input circuit for copper temperature error, thus eliminating necessity for heat insulating the input circuit and adding large zero temperature coefficient resistors, the use of which reduces the sensitivity of the system. This compensation results from an arrangement which causes the percentage change of current through the input coil of the galvanometer to be equal to the percentage change in the feedback coil. The loss of input sensitivity is balanced by decrease in the feedback factor and the gain remains constant with temperature changes. A system of this type may be operated with a current input in which case no temperature compensation is necessary.

In one general classification of the systems herein disclosed the radio frequency oscillator output is rectified to provide a direct control and/or indicating current and a feedback employed for output stabilization. In the other classification, the change in the D. C. impedance of the oscillator tube is employed to unbalance a bridge, and, thereby, provide the desired control and/or indication current and a feedback current employed for output stabilization.

It is important to note that in systems of either type frequency variation need not be considered, as only the magnitude of the radio frequency signal is significant, and thus frequency stabilization need not be provided.

In accordance with this invention in order to avoid the known weaknesses of a galvanometer, such as fragility and sensitiveness to acceleration and vibration, a special galvanometer design is provided, as part of this invention, resulting in a very rugged structure.

As a system of this type is effective for all desired purposes with a very small movement of the metal flag with respect to the oscillator coils, the galvanometer or senser unit, herein disclosed, is entirely feasible.

Before describing the various circuit combinations, the galvanometer 10 here of will be described in detail, with reference to Figures 3, 4 and 5. It is illustrated as comprising a suitable housing or container 1 having a removable cover 2. Within the compartment thus formed is a magnetic structure comprising a steel disc 4 closing the lower end of a cylindrical permanent magnet 3. The upper end of this magnet is closed by means of a steel plate 6 having a central aperture 9 into which the reduced end of the concentric iron core 8 lies. The core is attached to the plate 4 by means of a machine screw 11. The plates 4 and 6 and the magnet 3 are connected together by means of the screw 5 and threaded rods and nuts 7 and spacers 7'. Forming part of this unit is a supporting plate 12 forming a cantilever extension. This structure provides a magnetic field of cylindrical formation and of uniform flux distribution.

Mounted upon the plate 12 by means of the screws 14 is a supporting bar 13 to which is attached by means of the screws 16, a clamping plate 15. A light rigid bar 17, having a pair of transverse extensions 18, is supported by the clamping action of the clamp bar 15 on these extensions, which lie between it and the bar 13, as shown in Figures 4 and 5. A light lever 19 is provided, intermediate its ends, with a pair of upstruck tabs 20. These tabs are riveted to the arm 17. The result is that the lever 19 is resiliently supported by means of the flexible extensions 18 of the arm 17. The extensions 18 provide leaf springs, preferably made of thin flexible metal which act as cantilever or flexure bearings by means of which the lever 19 is supported. They provide for adequate angular motion of the lever 19, while maintaining positive stability transversely of its length. This resilient support for lever 19 is to be distinguished from the usual pivotal support for the pointer of a D'Arsonval galvanometer comprising a shaft journaled in bearings. A coil form 21 is attached to the end of the lever 19 which overlies the core 8. Wound on the coil form are a pair of insulated copper coils, which are diagrammatically illustrated in the various figures as, for example, in Figures 1 and 2, as the coils 38 and 39. Thus, it will be seen that these coils are suspended in the cylindrical magnetic field of the permanent magnet, and their movement with respect thereto is at right angles to the magnetic field, insuring maximum electrical reaction upon movement of the coils in that field.

Suspended from the plate 12 is a bracket 22 provided to support the lower end of a coil spring 23, the other end of which is attached to the lever 19 to preload it.

An insulating support 25, attached to the plate 12, has mounted thereon any suitable form of terminal clips arranged in the pairs 26 and 27. Light flexible leads 28 and 29 extend from the coils 38 and 39 on the coil form 21 to these terminal pairs, as illustrated in Figure 3. It will be understood that these lead pairs may be of such light construction as to in no way interfere with the movements of the lever or beam 19. A longitudinally positionable screw and nut 24 is mounted on the beam 19 to provide means for adjusting roughly the balance of the beam. Fine adjustment is provided by sliding the small weight 24' along the edge of the beam.

Supported on the plate 12 near its right hand end by means of three adjustable screws 34, is a housing 30 in which are mounted in spaced parallel relation the oscillator coils 32 and 33. This housing is mounted on the plate 12 by means of the screws 31, engaging threads in the screws 34, and by adjustment of the screws 34 coils 32 and 33 can exactly be positioned, with respect to the right hand end of the beam 19 forming the metal flag previously referred to.

Journaled in the housing 1 is a shaft 35 which is attached to the inner end of a spiral bi-metallic coil 36 producing automatic cold-junction compensation. The outer peripheral end of this spring is connected by a rigid connection 37 to the outer end of a spiral hair spring 17' attached at the center to the end of the light arm 17.

By means of a friction device of any suitable kind such as the loading spring 35'' on shaft 35 bearing on the loose collar 35' attached to the housing 1, a desired friction maintains any preload applied to the beam through the spring 17'. A pointer such as the pointer 38 of Figure 1 may be attached to the manual on shaft 35 for rotation with it.

Figure 2:
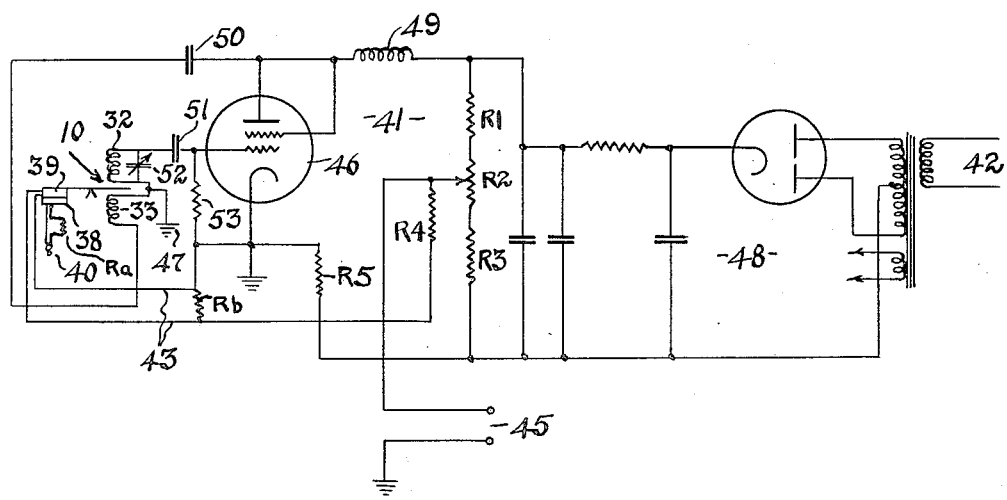
Figure 2 is a diagrammatic illustration of the essential elements of the system of Figure 1.
Figure 3:
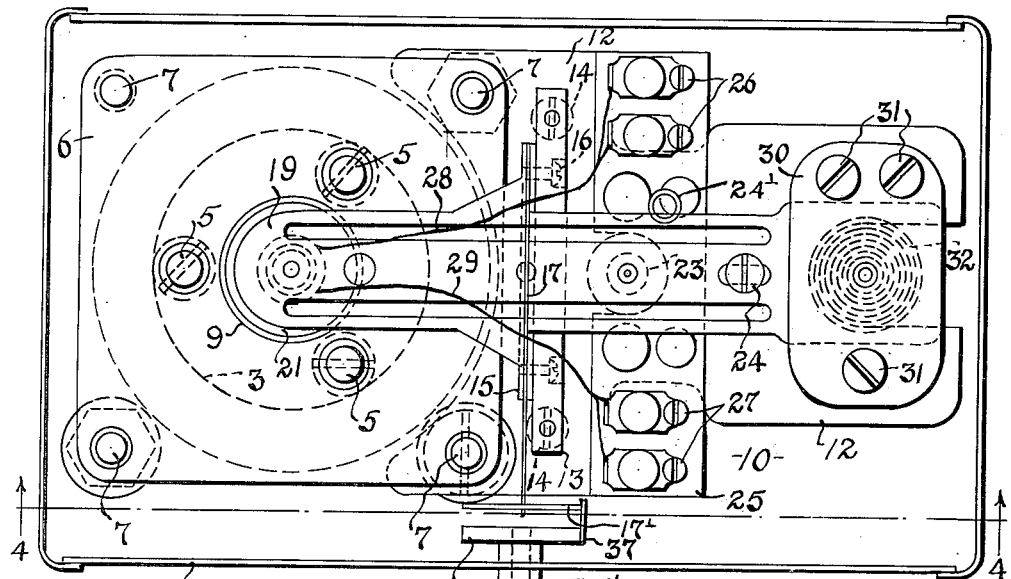
Figure 3 is a top plan view of the senser unit of this invention in one practical form shown within a housing with the cover removed.
Figure 4:
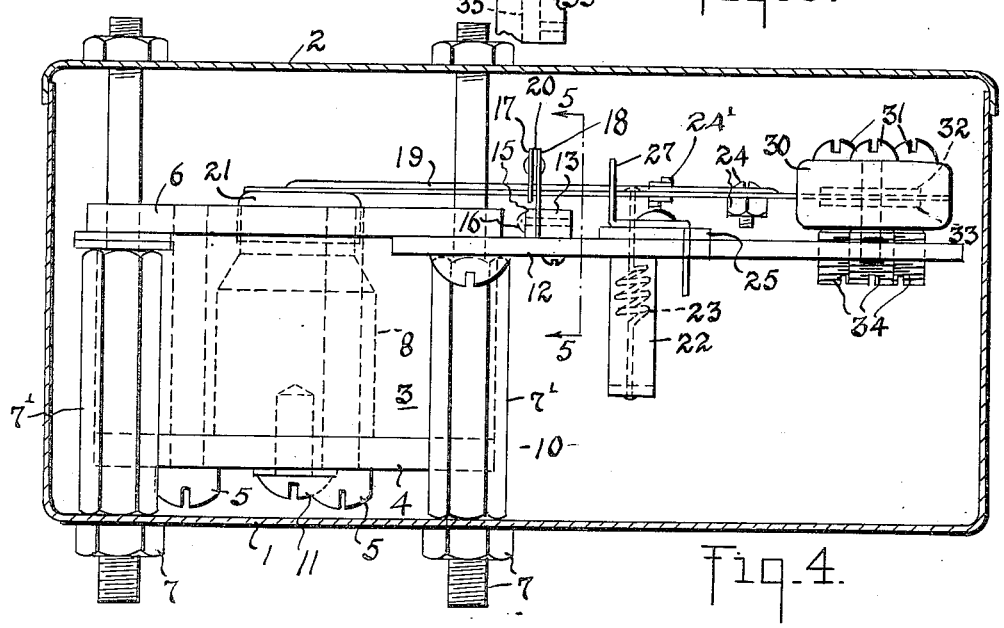
Figure 4 is a vertical, longitudinal, cross-sectional view taken on the line 4—4 of Figure 3.
Figure 5:
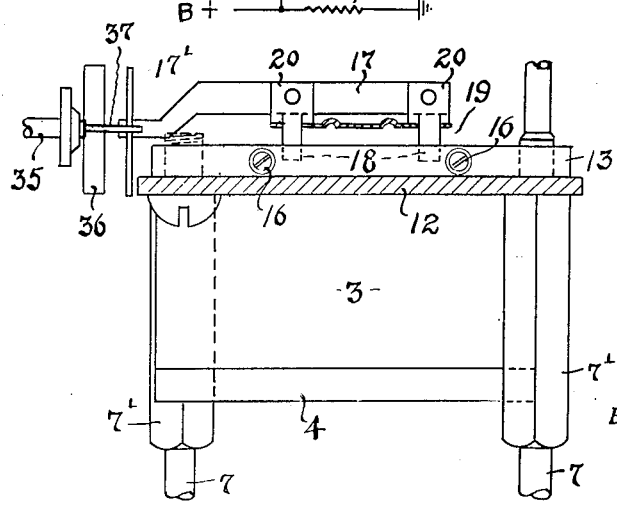
Figure 5 is a detailed cross-sectional view with some parts broken away taken on the line 5—5 of Figure 4.

The senser unit of Figures 3, 4 and 5 is more diagrammatically illustrated in Figures 1 and 2. A simpler form of the system, in accordance with this invention, is illustrated in these latter figures. As illustrated, the coil 38 is the input coil and is shown connected to a temperature sensitive device such as a thermocouple 40 which will generate an electrical current proportional to temperature changes. Of course, in the actual galvanometer the thermocouple leads will be connected to the terminals 26, Figure 3. Considering Figures 1 and 2 together the oscillator coils 32 and 33 form part of a tuned grid-tuned plate vacuum tube oscillator 46, of a well known type. In order to prevent the introduction of an error due to stray fields, static charges and the like, the common point of these coils is preferably grounded as indicated at 47. One of these coils, as for example coil 32, is shunted by a small variable capacitor 52 to aid in initial adjustment of the galvanometer.

The power supply for the apparatus is provided through the leads 42 to a suitable transformer full-wave vacuum tube rectifier and filter circuit 48, likewise of well known construction.

The usual adjuncts of the oscillator include the large condensers 50 and 51 for blocking the flow of direct currents in the radio frequency circuit, and the use of a radio frequency choke coil 49 for blocking the flow of alternating currents from the output circuit of the oscillator. The resistor 53 provides a grid bias for the oscillator cathode and the oscillator, as illustrated, employs a tetrode in which the screen grid is directly connected to the plate. Capacitor 51 also forms part of the grid leak circuit which includes resistor 53, so that with increasing amplitude the control grid is more negatively biased. In the output circuit of the oscillator are resistors $R_1$, $R_2$, $R_3$ and $R_5$ to which one of the feedback leads 43 is adjustably connected, as shown, through a suitable voltage proportioning resistor $R_4$. The other lead for the feedback coil 39 is connected to the grounded cathode, as shown. The direct current output circuit is provided by the leads 45, one of which is grounded and the other of which is connected to the variable tap for the resistor $R_2$.

As illustrated in Figure 1, an indicating device 44 may be provided by means of which, upon suitable calibration, variations in the temperature being measured can be indicated. As will appear later, the output circuit 45 may also be employed either with or without indication to effect control of a process the temperature of which is being monitored by the thermocouple 40. To complete the explanation of the relationship of Figures 1 and 2, it is noted that the oscillator-amplifier mechanism has been generally indicated by the reference numeral 41. As previously mentioned, the shaft 35, see Figure 1, may be provided with a pointer 38' operating on a scale to mechanically indicate upon proper calibration the temperature changes being measured or monitored.

A study of Figure 2 will indicate that the oscillator feeds an adjustable direct current bridge with the tube 46 in one leg, providing a high load resistance. It will be readily understood that as the temperature changes the thermocouple current will vary in the coil 38, effecting a movement of the beam 19 and, therefore, the flag end thereof, with respect to the coils 32 and 33. This movement of the flag will provide a change in load on the tank circuits of the oscillator with consequent variation in the output voltage of the oscillator. As a result the resistance of oscillator tube in one leg of the bridge will vary, in accordance with changes in the temperature of the source being monitored by the thermocouple 40. It follows that this variation will appear as a voltage change in the output circuit 45, and effect a corresponding operation of the indicating device 44. A proportion of this voltage, determined by the resistor $R_4$ will be applied to the feedback coil 39 to partially balance or oppose the movement of the beam 19, which initiated these electrical variations.

To compensate for variations of input coil resistance with ambient temperature changes when a voltage input is being measured, a resistor $Ra$ is connected in series with the input coil 38 and a resistor $Rb$ is connected in parallel with the feedback coil 39. Resistors $Ra$ and $Rb$ are of the type which have a zero temperature coefficient of resistance. By selecting suitable values for resistors $Ra$ and $Rb$ any change in the current in input coil 38, resulting from a change in the electrical resistance of the coil, is compensated by an equivalent change of current in the feedback coil 39. Complete compensation is approached as the ratio of Ra to Rb becomes equal to the ratio of "input coil resistance" to "feedback coil resistance." This compensating feature can be used in the various systems herein disclosed.

All of the advantages of the general combination hereinbefore set forth result from this arrangement, one of the more important of which is the overall stabilization of the system resulting from the feeding back of a portion of the output current to the stabilizing coil 39 of the galvanometer.

This arrangement is very sensitive due to the large gain factor resulting from mechanical and electrical amplification of what may be very small mechanical movements of the metal flag. Sensitivity is enhanced by the fact that all of the turns of the coils 38 and 39 cut across the lines of the magnetic field at right angles, and the low frictional loss in the leaf spring supports for the beam. Mounting the coils at the end of the beam 19 provides a torque to input ratio that is higher than that usually attainable, which would be detrimental were it not for the feedback control provided. Additionally, the natural period of the system tends to be reduced by feedback, as will be apparent.

In view of the foregoing, it will be seen that this system combines the advantages of a high torque to current input ratio, rugged shock resistant construction, simplicity of assembly and a fast time response, all due to the feedback factor. In addition, the galvanometer construction is suitable as the input stage of a high gain stable D. C. amplifier. It will be understood, of course, that under some conditions additional stages of electrical amplification may be used so that very high overall gain ratios, as high as 50,000, can be provided, with stability.

This system also provides, by reason of the use of the high frequency oscillator, which simplifies rectification and filtering of the output, an impedance change from the low input impedance of the galvanometer coil 38 to the high impedance direct current output circuit. Feedback also accomplishes improved frequency response, and the high impedance output makes possible the addition, when required, of further stages of electronic amplification, all of which can be stabilized statically by feeding back from the final output circuit. This system also eliminates the necessity for voltage regulators of any sort and reduces the effect of disturbance, such as ambient temperature and humidity changes.

The use of the beam structure in the senser to provide mechanical measurement makes it possible easily to provide mechanical setting of the input operating level represented, for example, by adjustment of the tension provided by spring 23. Any steady component of input can thus be easily balanced out either by manual or automatic compensation.

The high impedance output plus the feedback feature of this system permits the output of several galvanometer or senser units 10 to be connected in parallel with the feedback coils of the galvanometer in series, for selective amplification of the highest of a group of input signals. The system of Figure 6 is illustrative.

Figure 6:
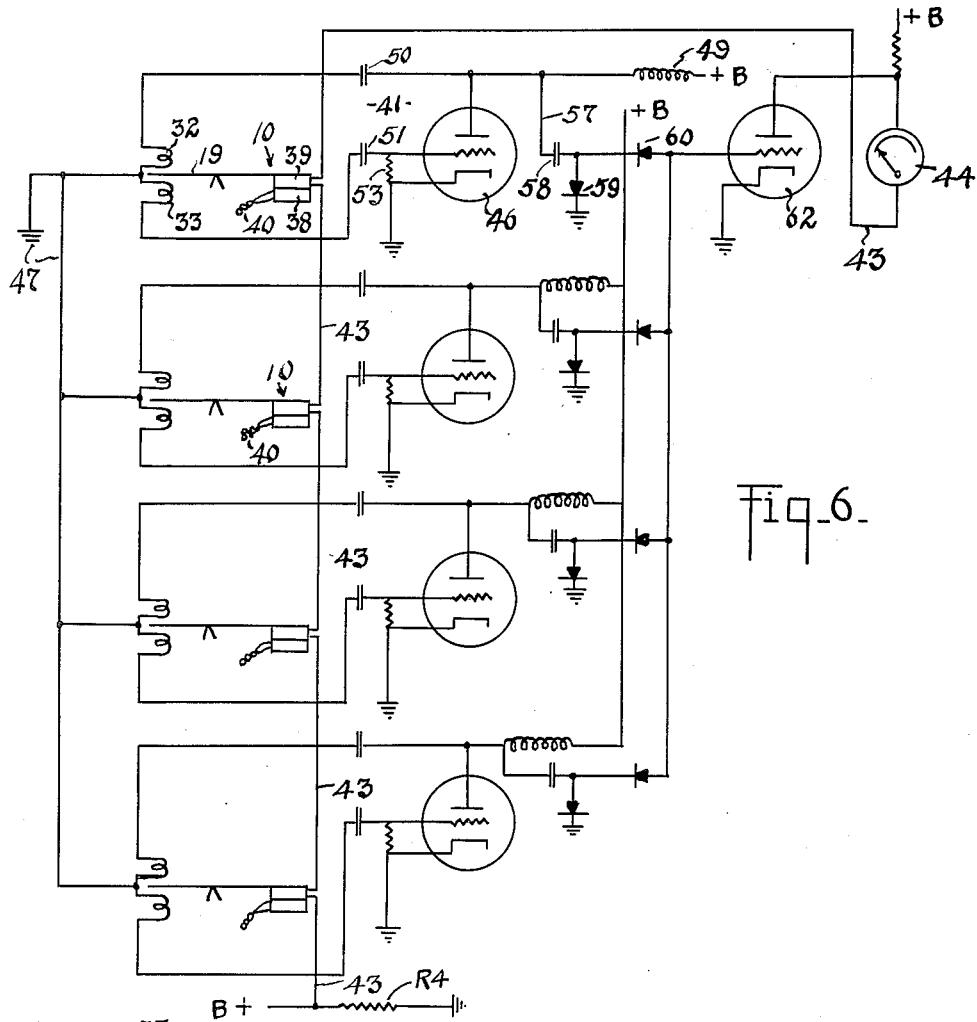
Figure 6 is a circuit diagram of a system employing the foregoing elements of this invention for the purpose of indicating the maximum on a plurality of temperature conditions simultaneously monitored.

The system of Figure 6 may be employed to indicate the temperature of the hottest of a plurality of heat sources such as for example, the bearings of one or more aircraft engines. One disadvantages of present systems for this purpose is the necessity of providing a plurality of indicating instruments one for each of the bearings being monitored, a disadvantage in view of the already overcrowded instrument panels of the modern airplane. The system of Figure 6 provides a practical substitute employing only one indicating instrument. This system employs a plurality of combinations like that of Figures 1 and 2, and, therefore, similar reference numerals will be used wherever possible. The four senser units of Figure 6 are diagrammatically illustrated at 10. The midpoint of each of the pairs of oscillator coils 32 and 33 is grounded as before at 47. The operating coil 38 of each unit 10 is energized by means of a thermocouple 40, one of each of which is associated with the bearing being monitored. The oscillator coils 32 and 33 form part of the tuned grid-turned plate oscillators 41. The output circuit of each oscillator includes the radio frequency choke coil 49. The plate of each oscillator is shunted to ground through a radio frequency bypass condenser 58 and a half-wave rectifier 59 poled so that the positive pulses of the output current may return to the cathode. The common point of the condensers 58 and rectifiers 59 are connected to a half-wave rectifier 60 poled to pass the negative components of the output current to the grid of the common amplifier tube 62. All of the rectifiers 60 are connected in parallel to the grid of this tube. As before, the indicating meter 44 is in the output circuit of this final amplifier 62, and a desired portion of the output current as determined by the resistor $R_4$, is passed in series through each of the feedback coils 39 of the senser units 10.

As circuit technicians will appreciate, when this circuit is in operation the thermocouple temperatures are measured by each of the senser units or galvanometers 10 and the levers or beams 19 thereof are each displaced in proportion to the magnitude of the thermocouple current of the associated thermocouple. Thus, the output of each oscillator 41 will be proportionately varied. The positive half of each of the output currents will flow in the output circuits of the associated oscillators, and the negative halves of these currents will pass through the rectifiers 60 and negatively polarize the grid of the amplifier 62. Thus, the negative grid bias of this amplifier will be determined by the maximum negative voltage output of the rectifier 60, of the four rectifiers in parallel, connected to the oscillator associated with the thermocouple of the hottest bearing. Thus, the indicating lever 44, if properly calibrated, will indicate the temperature of the hottest bearing monitored by this system. Although the system of Figure 6 will not indicate which is the hottest bearing, it will indicate whether one of the bearings being monitored has reached a dangerous temperature, so suitable precautionary measures can be taken. For many installations, it is obvious that it is more important to know when one bearing is dangerously hot rather than which bearing is overheated. The accuracy of this system is assured by feeding back the output current or a portion thereof, to the senser units in series and, suitable automatic bi-metallic compensation for cold junction variation is provided as is illustrated in Figures 3 and 5.

It is convenient at this point to refer to Figure 11 which illustrates an amplification of the system of Figure 6 wherein the hottest bearing can be selectively determined. The system of Figure 11 is quite similar to that of Figure 6, and is illustrated as suitable for monitoring the temperature of four sources, as in the former case. In each of the leads from the thermocouples 40 is connected in series, a resistor 56, and means is provided for applying a direct current voltage successively across the terminals of these resistors, either in aid of the voltage of the circuit or in opposition thereto.

The galvanometer or senser units 10, the oscillators 41 and the amplifiers and rectifiers 41' are all shown connected in parallel to a common amplifier 62, the output of which is indicated by the meter 44. It will be understood that the combined amplifiers and rectifiers 41' correspond to the arrangement in Figure 6, whereby the amplifier 62 is fed with a negative biasing potential comprising the amplified output of the amplifiers. It will also be understood that the feedback feature is also included in this setup. The supply leads 42' for the amplifier, in the event that a D. C. source is employed, are also used to supply the test voltage through the reversing switch 54. Of course, the source of the test voltage can be different than the source of the amplifier, but the diagrammatic illustration in Figure 3 is sutiable for the purpose of explaining the invention. The reversing switch 54 is connected to the movable contact of each of a pair of single pole four contact switches; the movable contacts of which are moved in synchronism by means of the manual on the shaft to which the movable contacts are connected. Each of the fixed contacts of the two sets of switches 55 are respectively connected to opposite sides of each of the resistors 56 as is clear from the drawing.

In the use of this arrangement with the movable contacts of switch 55 out of engagement with any of the fixed contacts, the system will work in the same manner as the system of Figure 6 indicating the highest of the four temperatures being monitored. By means of the switch 55 it is possible to determine whether all of the individual monitoring circuits are operating, and which particular one is monitoring the hottest bearing, in the case of a bearing testing system. By rotating the shaft of switch 55, it will be seen that the voltage from the circuit 42' can be successively impressed across the resistors 56 in the various thermocouple circuits. If the reversing switch 54 is in a position so that the test voltage is aiding the thermocouple voltage, the reading on the meter 44 for each thermocouple will be increased the same amount. Thus it will be seen that if an indication is given for each position of switch 55 it will be known that each monitoring circuit is operative. Likewise, the highest reading for all four positions of switch 55 will immediately indicate which thermocouple is reading the highest temperature since, of course, the fixed contacts of switch 55 will bear a known relationship to the thermocouples. In the event that the thermocouple indications are quite low, it is possible by throwing reversing switch 54 to its other position to give readings which will not only permit testing of each monitoring circuit but also, by giving a high indication, indicate which is monitoring the hottest bearing.

Figures 7, 8 and 9 show another application of the principles of this invention wherein is illustrated a system for automatically maintaining a heat process at a predetermined controlled operating temperature. The system is very diagrammatically illustrated in Figure 7 employing the galvanometer 10, as before, for controlling the output of an oscillator feeding a D. C. bridge, as before, and employing the feedback feature. These elements are diagrammatically illustrated at 63 and include additional elements to be described. The final output of the circuit is an alternating current supplying a reversible induction motor 66, through the circuit connection 65 to in turn operate a valve 67 in the line 68, through which the heating medium passes to the process. The thermocouple 40, of course, meters the temperature of the process, and the apparatus is designed to correct any deviations in the temperature of the process from the predetermined value, by increasing or decreasing the supply of heating medium thereto.

The full mechanism of Figure 7 is shown diagrammatically in greater detail in Figure 8. The galvanometer or senser unit 10 is supplied through the input circuit by means of the thermocouple and controls the output of the oscillator 41 which feeds the high impedance D. C. bridge 69. A stabilizing direct current is fed back through the circuit 43 to the galvanometer as before. The fluctuations in D. C. potential across the bridge 69 are fed into a stabilizing network 70, which is designed to respond to the rate of change in magnitude of the frequency. The D. C. output (positive or negative) of the bridge 70 is applied to a phase control tube or stage 71 by means of which the phase of an alternating current of lower frequency is reversed and fed to the input of a push-pull amplifier 72. This amplifier increases the amplitude of the low frequency current to a value suitable to operate a reversible motor 66 which drives the valve 67. A power rectifier 74 supplied through the circuit 73 provides the D. C. operating potentials for the various circuit subcombinations.

The system diagrammatically illustrated in Figure 7 is shown in sufficient detail in Figure 9 to permit reproduction by those skilled in the art. It will be seen that up to the stabilizing network 70 the circuit is the same as that illustrated in Figure 2 and similar reference characters have been employed. The only change which does not involve a difference is that the resistors $R_1$, $R_2$ and $R_3$ have been combined into resistor $R_2$. The direct current output of the bridge 69 supplies positive and negative signals through the stabilizing network 70 to cause corresponding polarization of the grids of the duotriode of the phase control stage 71. A pulsating direct current flows in the output circuit due to A. C. energization, as shown, of a magnitude proportional to the magnitude and rate of change of the signal from the bridge 69. The pulsating direct current flowing in the primary of the transformer produces an alternating current in the secondary thereof which is amplified by the second duo-triode by the push-pull amplifier 72 to supply an alternating current suitable to operate the motor 66 in either direction, depending upon the direction of deviation of the temperature of the process being monitored from the predetermined setting.

Circuit technicians will understand that when the temperature being monitored is constant, and at the preselected value, there will be no change in current flowing in the D. C. bridge 69. Hence, the phase control stage 71 will be in balance. It follows, therefore, that the motor 66 is at a standstill. Should the temperature drop from the predetermined value an alternating current of proper phase will appear in the output circuit of the push-pull amplifier 72 to energize motor 66 to operate the valve 67 to supply more heating medium to the process. As the temperature returns to the preselected value, the energizing current for motor 66 will die out. On the other hand, if the temperature of the process being monitored rises, motor 66 will be operated in the reverse direction to close valve 67 and cut off the supply of heating medium.

Upon review it will be seen that this system is adapted to rectify the high frequency oscillator output to provide a direct current for feedback purposes and controls the operating current for motor 66.

Figure 10 diagrammatically illustrates a system for remotely indicating changes in a variable such as, for example, pressure changes. In this arrangement the transmitter T includes the galvanometer 10, which is similar to that previously described, with the exception that the coil 39 has been dispensed with, leaving only the feedback coil 38. The oscillatable beam 19 is used as before with one end interposed between the oscillator coils 32 and 33, forming part of the vacuum tube oscillator 78. The pressure fluid is supplied through the line 76 to a Bourdon tube 75, which is connected by means of a resilient link 77 to the beam 19. The purpose of link 77 is to convert the motion of the Bourdon tube 75 into an operating force for the beam 19. Coil 38 is connected in the output circuit of the oscillator, as before, and to any suitable form of detector unit 80, which can be a vacuum tube detector. The remote indicating system is shown generally at I and includes another galvanometer 10 just like that at the transmitting end. The beam 19 of this galvanometer has its flag end related to the oscillator coils 32 and 33 forming part of the oscillator 79. The output of this oscillator is connected to the coil 38 of the galvanometer and, also, to the input of the detector 80. The output of the detector is fed to an amplifier 81 which may be a system such as that shown in Figure 9, wherein the output of the amplifier comprises an A. C. current to operate the servomotor 82. This servomotor is connected by a friction drive wheel or pinion 83 with a driven gear or friction wheel 84 in the form of a graduated dial. The dial is, of course, rotatamly mounted, and is connected by means of a spring 86 to the beam 19. A fixed pointer 85 cooperates with the graduations on dial 84 to indicate the magnitude of the pressure being measured.

In the operation of this system, pressure changes in the line 76 will cause a movement of the free end of the Bourdon spring 75, which movement will be transmitted through the link 77 to the resiliently mounted beam 19. The flag end of the beam will move with respect to the oscillator coils 32 and 33 and, thereby, change the amplitude of output of the oscillator in a direction corresponding to an increase or decrease in pressure in the line 76. As a result, the output current will flow to ground through resistor 10ª, producing a voltage proportional to the pressure. The current flowing in coil 38 balances the force of spring 77. For any position of the disc 84 a force is applied to the beam 19 through the spring 86. Thus, the beam 19 will be tipped in the proper direction to cause the oscillator 79 to have its output varied in the proper direction. The output of this oscillator is fed to the coil 38 of the indicating galvanometer 10 and, also, to ground through resistor 10ᵇ. If the voltage drop through resistor 10ᵇ does not equal the voltage drop through resistor 10ª, current will flow through the detector 80 to the control output of amplifier 81 and hence the operating current for motor 82, operating it in the proper direction to apply a force to the beam 19 through spring 86 to vary the output of the oscillator 79 until the voltage drop across 10ᵇ equals that across 10ª. The system is then in null balance and the magnitude of the pressure being measured is indicated on dial 84. At this point it will be noted that the magnetic reaction of the coils 38 will be in a direction to oppose the movement applied to the beam 19 of each galvanometer. Thus, upon proper calibration of the dial 84, its relative position with respect to the pointer 85 will indicate the pressure in the line 76. This system provides a method of converting pressure variations into calibrated indications of the value thereof at a remote point, and these indications will be proportional to the potentials which are in null balance.

It will, of course, be understood that other variables, including potentials, can be measured by properly changing the actuator for the transmitting galvanometer beam. For example, temperature changes could be employed to mechanically, as well as electrically, affect the position of the transmitting beam 19 to produce similar operations.

The system of Figure 12 is a modified arrangement for indicating the variations in the magnitudes of variables, whose variations can be converted into direct current. As in all previous cases, the galvanometer 10 is employed, but which in this case has only the input coil 39, the feedback coil having been eliminated. The D. C. input circuit to this coil is supplied with the varying direct current, which is representative of the variable factor to be measured. The resiliently mounted beam 19 is supported in this case by means of a bar 87, and as in the previous cases, the arm 19 is connected to the beam for angular movement therewith. At 88 is a shaft rotatably supported in bearings, not shown, and connected to the end of the lever 17 by means of calibrated spring 89. The shaft is also connected to the support 87 by means of a return spring 90. Secured to the shaft is a gear 91 and a pointer 92. The pointer moves over a suitably calibrated dial 93. A motor 94 drives the gear 91. The flag end of the beam 19 is displaceable with respect to the oscillator coil 96, forming part of a combined oscillator and full wave rectifier 95. The power supply is from the line 97. The oscillator and rectifier functions are performed by the combination triode and diode, the triode providing one-half of the full wave rectifier, which includes the diode.

The direct current input, varying in proportion to changes in the variable to be measured, is fed to the coil 39. The reaction of this coil on the magnetic field of the galvanometer causes a displacement of the beam 19 and, of course, its flag end, with respect to the oscillator coil 96. This movement of the flag results in a change in the output of the oscillator 95, which output is fully rectified to provide an A. C. operating current for the motor 94. Of course, the displacement of the beam 19 stresses the calibrated spring 89. Operation of the motor 94 causes the shaft 88 to revolve with the result that the pointer 96 is proportionately displaced on the dial 93 to indicate the value of the variable being measured. The output of the oscillator will be proportional to the displacement of the beam and, therefore, motor 94 will operate the pointer 92 until the springs 89 and 90 are stressed to a point to balance the drive force of the motor. The pointer thereupon comes to rest, and remains stationary until the variable D. C. input varies, either by increasing or decreasing. If it increases the pointer will be moved further up the scale, and if it decreases the output of the oscillator will decrease reducing the torque on the motor 94, which is then driven down scale to a balanced condition by the return spring 90. Thus, the pointer moves down the scale to indicate the new value of the variable. The pointer comes to rest on the up scale movement of the pointer by reason of the balancing force of the calibrated spring 89, acting through lever 17 on the beam 19 to balance the magnetic force of the galvanometer produced by the direct input.

There is disclosed in Figure 13 in a schematic and diagrammatic manner, a further application of the principles of this invention wherein the galvanometer or senser unit is employed to produce an amplified direct current voltage proportional to variations from a current the magnitude of which is representative of the fluctuations of a variable. In this arrangement the senser unit 10 again employs both the coils 38 and 39 mounted on the resiliently and pivotally mounted beam 19 as in previous cases. The D. C. input to be magnified is applied to the coil 38 through the leads marked D. C. input, from any source of pulsating direct current such as a thermocouple. Connected to the beam 19 for oscillation therewith is the arm 17 as before, which is connected by means of a spring 36 to a shaft carrying a pointer 38 operable with respect to a fixed scale. As before, the shaft may be provided with any suitable form of friction device for preloading the instrument to prevent its operation below a predetermined minimum value of variation input current. The scale provides a means for facilitating preloading the instrument to prevent its operation below a predetermined minimum value of variation input current. Mounted on the insulated bracket 99 is a fixed contact positioned to cooperate with a contact 100 mounted on the beam 19 and in electrical contact therewith. The fixed contact is connected by a wire to a suitable source of direct current 98. The movable contact 100 is grounded as shown. The other side of the current source 98 is connected to one terminal of each of the resistors 102 and 108 by means of the wire 101. Resistor 108 is provided with a movable contact connected to wire 109 which connects to one terminal of coil 39, the other terminal of which is grounded at 110, as shown. The other terminal of resistor 102 is connected to one terminal of resistor 104, the common terminal of which is connected to ground through a capacitor 103. One of the output leads 107 is connected to the other terminal of the resistor 104 which is grounded through capacitor 105. The other lead 107 is grounded and a resistor 106 is shunted thereacross.

The operation of this system is in the nature of a voltage regulator by means of which a small measuring voltage actuates the device to regulate the supply of voltage from the high potential source 98 so that an amplified D. C. voltage appears at the output terminals 107. In view of the previous disclosure it will be appreciated that when a direct current is supplied to the coil 38 beam 19 is rotated on its supports causing movable contact 100 to engage the fixed contact. As a result the battery 98 will apply its potential instantaneously to the circuit of resistor 108 and coil 39, causing current to flow and producing a magnetic force in opposition to the force of current in coil 38. Thereupon, beam 39 reverses its rotation and movable contact 100 disengages the fixed contact, stopping the flow of current in coil 39. This operation will then repeat to give beam 19 an oscillating motion and produces a pulsating direct current in the circuit of resistor 108 and coil 39. The pulsating direct current applies a voltage to the circuit of resistor 106 which is proportional to the average value of the current and the resistance in the circuit of coil 39 and resistor 108. The values of the resistors 102 and 104 and capacitors 103 and 105 are selected to reduce the pulsating component of the applied voltage to required values. Since the average value of the current in coil 39 is proportional to the current in coil 38, the output voltage at 107 is proportional to the D. C. input to coil 38.

Thus it will be seen that the galvanometer or senser unit herein disclosed may be used for control, and if desired indicating functions, without employing an oscillator in combination therewith.

In view of the wide variation in the application of the principles of this invention as indicated by this disclosure, it will be apparent to those skilled in the art that the subject matter of this invention can be embodied in many physical forms, and I do not, therefore, desire to be limited except as required by the appended claims.

What is claimed is:

1. In a continuous control system the combination comprising a galvanometer having means forming a magnetic field, a resiliently mounted member, and an input coil, said coil being connected to said member and mounted in said magnetic field, a vacuum tube oscillator having a tank circuit, the movement of said member varying the load of said tank circuit to produce an amplified direct current, electrical means, energized by said direct current, acting to oppose the displacement of said resiliently mounted member, means connecting to said input coil for generating a current proportional to the deviation of a condition to be controlled from a predetermined value, and means actuated by said direct current for causing said condition to return to its predetermined value.

2. In the combination of claim 1, means for resiliently loading said member to preselect said predetermined value.

3. In a control system the combination comprising a galvanometer having means forming a magnetic field, a pivoted beam, an input coil and a stabilizing coil connected to said beam and mounted in said magnetic field, a vacuum tube oscillator having a tank circuit, the movements of said beam varying the loading of said tank circuit to produce an amplified direct current, said stabilizing coil being energized by said direct current, means connected to said input coil for generating a current proportional to the deviation of a condition to be controlled from a predetermined value, and means actuated by said direct current for causing said condition to return to its predetermined value.

4. In the combination of claim 3, means for resiliently loading said beam to preselect said predetermined value.

5. A metering system of the type described comprising in combination a pivoted metallic beam having input and feedback coils fixed thereon, means for producing a fixed magnetic field in which said coils move along the axis of said field, means for energizing said input coil to effect displacement of said beam, and means for supplying a direct current to said feedback coil in response to displacement of said beam including an oscillator having an input and an output circuit and a tuning coil in at least one of said circuits positioned adjacent one end of said beam, said feedback coil opposing displacement of said beam.

6. In the combination of claim 5, means for compensating for the effects of ambient temperature variations on the resistance of said input coil and said feedback coil comprising resistors of zero temperature coefficient, one in series with said input coil and the other in parallel with said feedback coil.

7. A metering system of the type described comprising in combination a vacuum tube oscillator having a tunable tank circuit, a galvanometer having an operating coil, a signal input circuit for said coil, a resiliently mounted member proportionally displaced by energization of said coil, said member being displaced with respect to said tank circuit to vary the output of said oscillator upon movement of said member, an output circuit for said oscillator in which the voltage is proportional to the displacement of said member, a second coil energized by said oscillator for opposing the displacement of said member, a work circuit connected to said output circuit, and means for compensating for the effects of ambient temperature variation on the resistance of the operating coil and the second coil comprising resistors of zero temperature coefficient one connected in series with said operating coil and the other in parallel with said second coil.

8. A galvanometer of the type described comprising means forming an annular magnetic field, a resiliently mounted beam, a pair of coils secured to one end of said beam and disposed in said magnetic field, at least one inductance mounted adjacent an end of said beam, and spring means for preloading said beam.

9. In the combination of claim 8, said spring means comprising a rotatably mounted shaft and a spring for interconnecting said shaft with said beam.

CHARLES GARLAND ROPER.

REFERENCES CITED

The following references are of record in the file of this patent:

UNITED STATES PATENTS

| Number | Name | Date |
|---|---|---|
| 1,639,365 | Brown | Aug. 16, 1927 |
| 2,016,894 | Faus | Oct. 8, 1935 |
| 2,085,128 | Staege | June 29, 1937 |
| 2,117,894 | Lenehan | May 17, 1938 |
| 2,154,260 | Brandenburger | Apr. 11, 1939 |
| 2,234,184 | MacLaren, Jr. | Mar. 11, 1941 |
| 2,325,232 | Davis | July 27, 1943 |
| 2,362,562 | Kelly | Nov. 14, 1944 |
| 2,376,527 | Wills | May 22, 1945 |
| 2,409,073 | Sias | Oct. 8, 1946 |
| 2,423,616 | Rath | July 8, 1947 |
| 2,423,617 | Rath | July 8, 1947 |
| 2,446,390 | Rath | Aug. 3, 1948 |

FOREIGN PATENTS

| Number | Country | Date |
|---|---|---|
| 179,805 | Switzerland | Dec. 2, 1935 |